June 7, 1932.  A. L. CULBERTSON  1,861,492
CONTINUOUS FURNACE
Filed Aug. 24, 1931  9 Sheets-Sheet 5
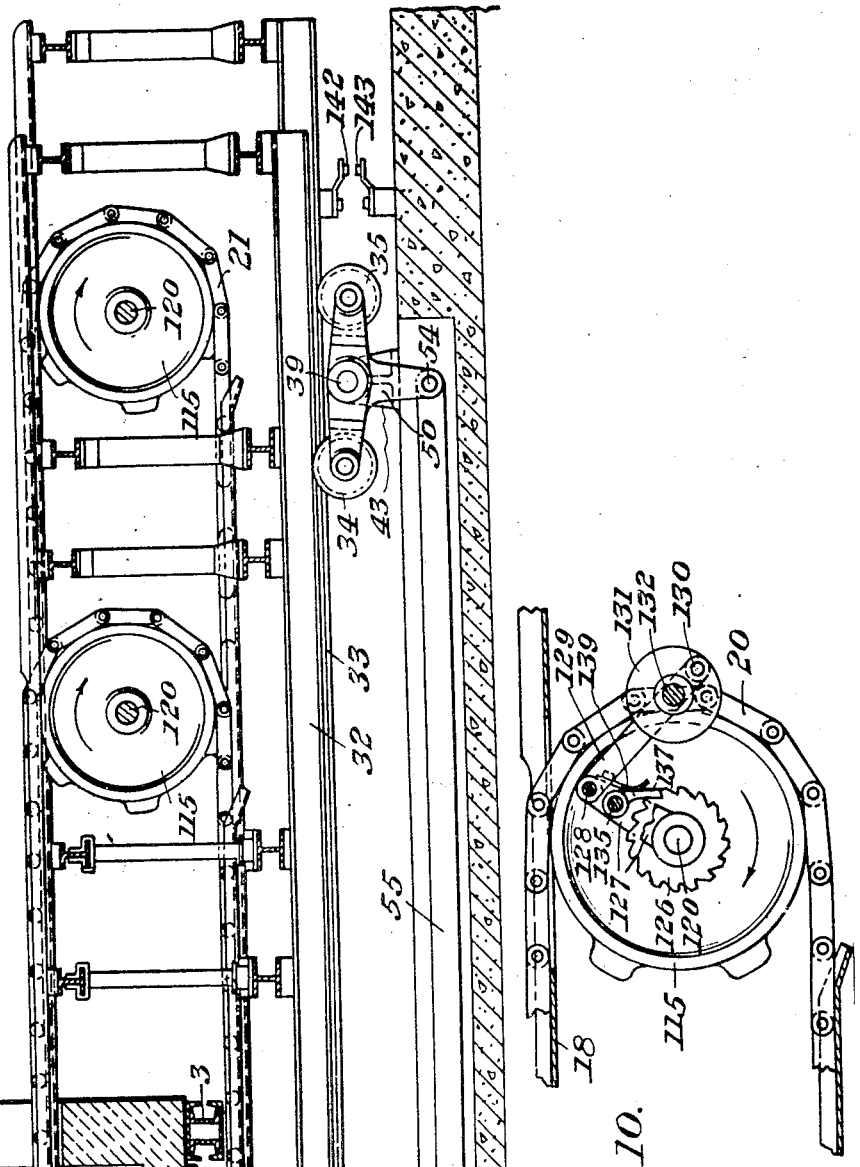
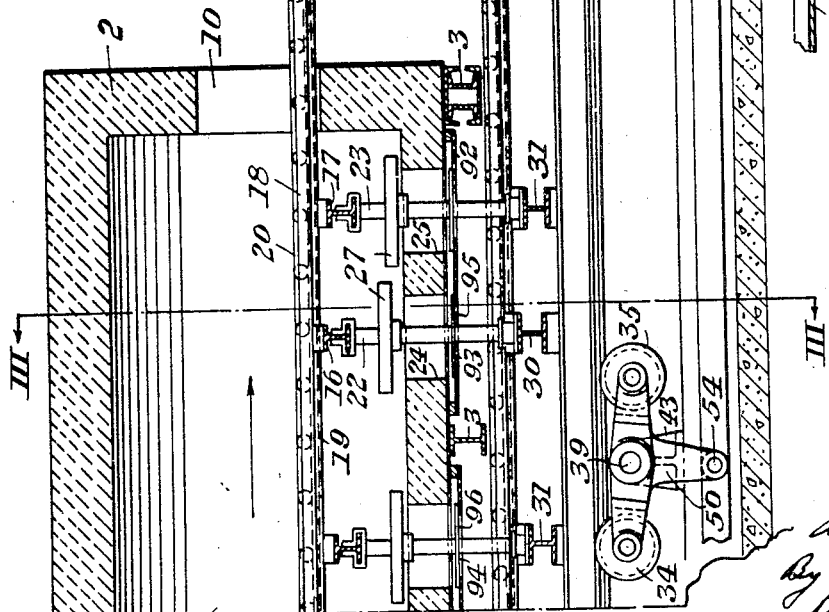
INVENTOR
Albert L. Culbertson
By Byrnes, Stebbins,
Parmelee & Blenko
Attorneys INVENTOR
Albert L. Culbertson
By Byrnes, Stebbins,
Parmelee & Blenko
Attorneys June 7, 1932. A. L. CULBERTSON 1,861,492
CONTINUOUS FURNACE
Filed Aug. 24, 1931 9 Sheets-Sheet 8

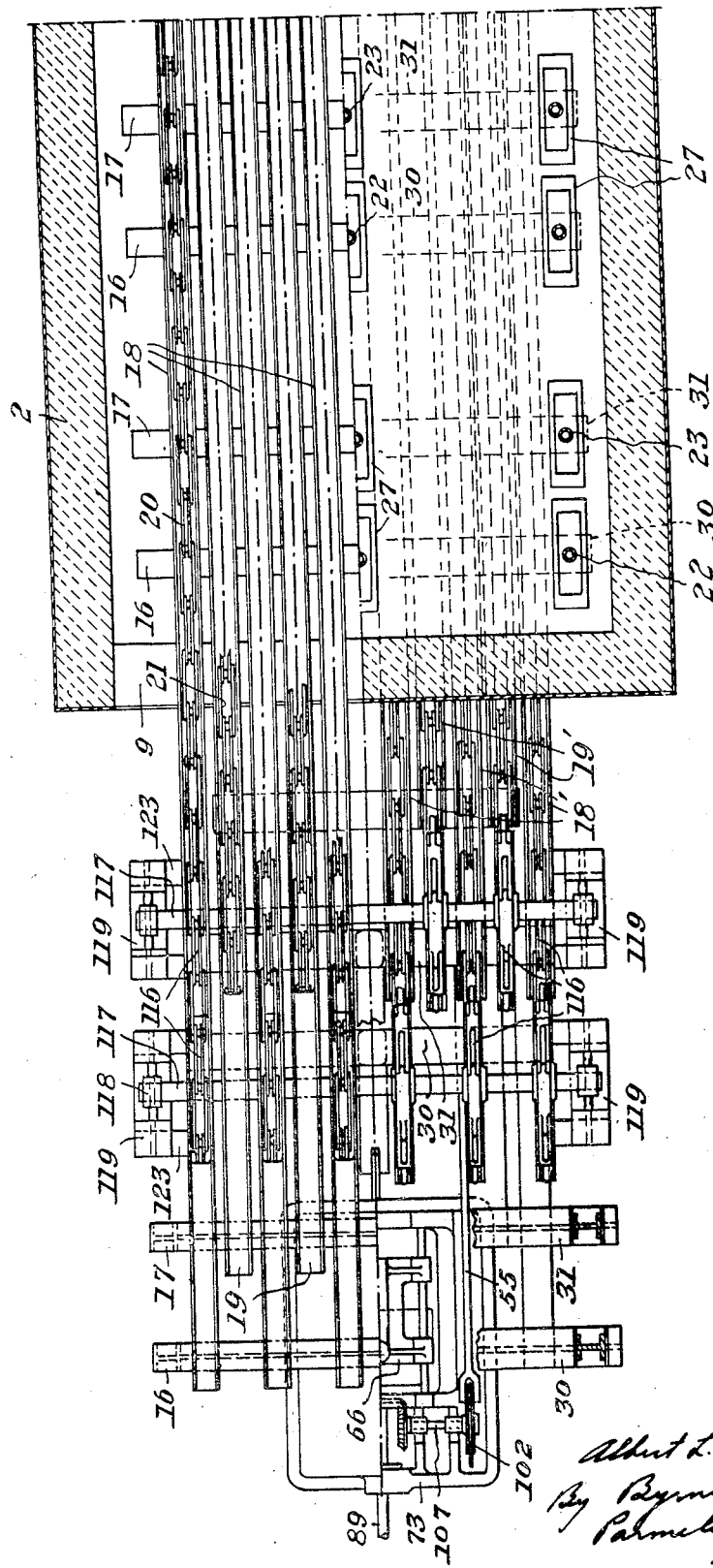

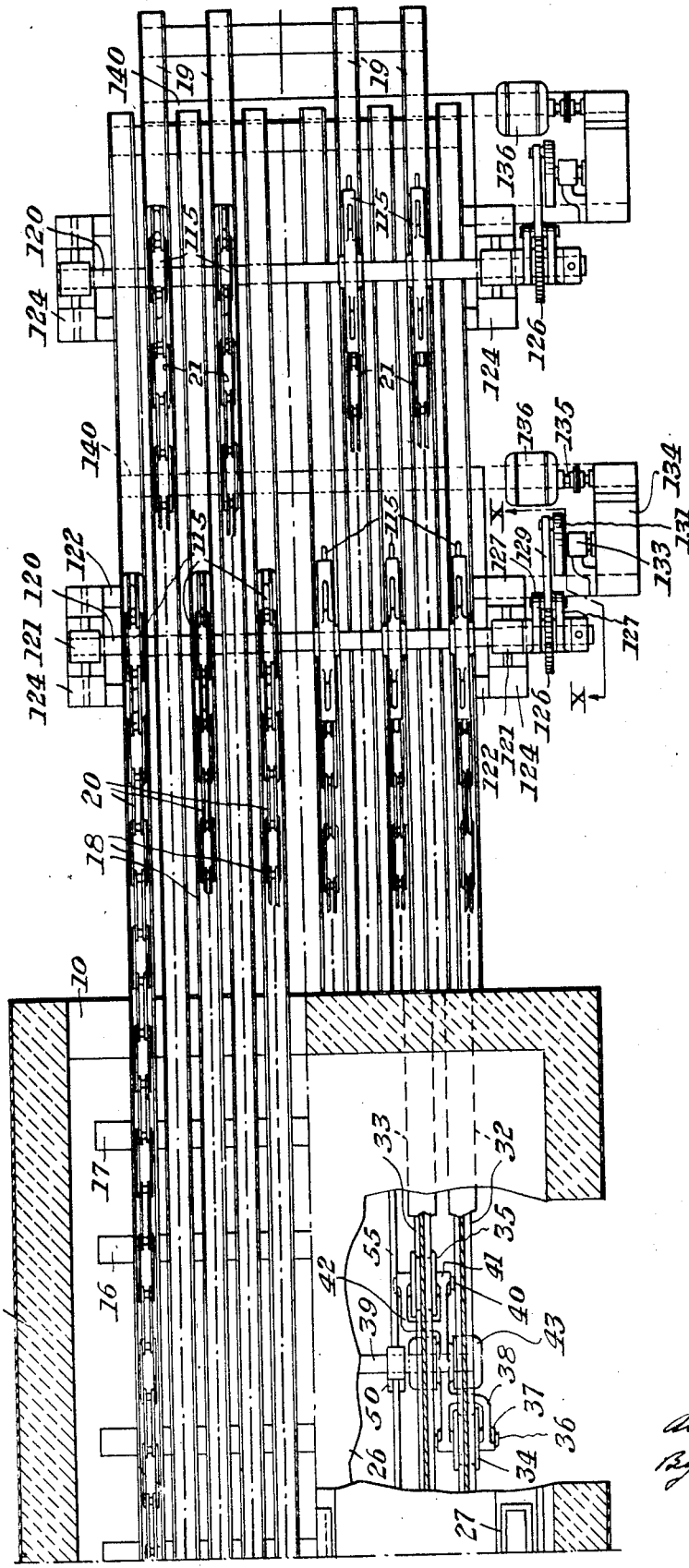

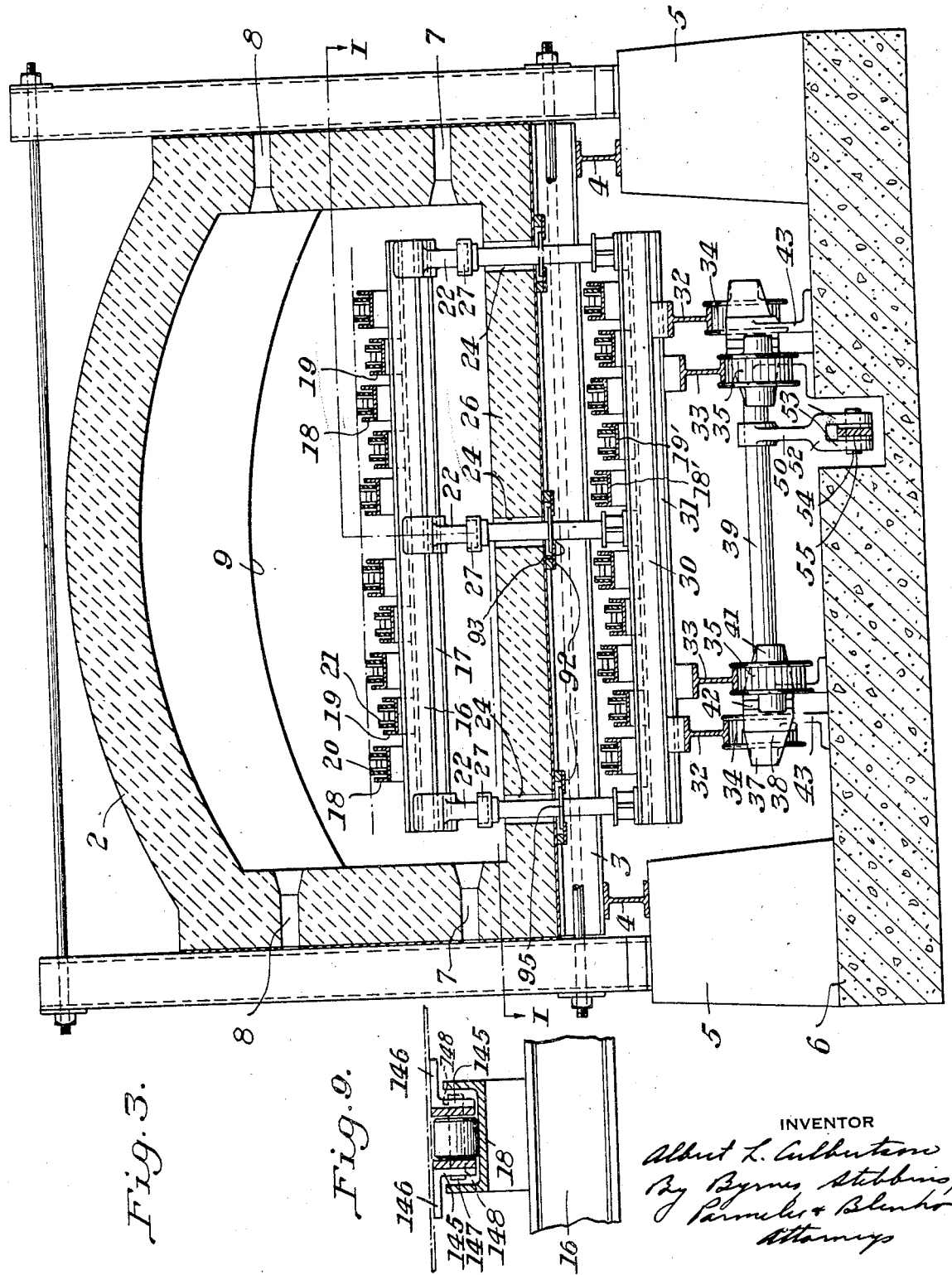

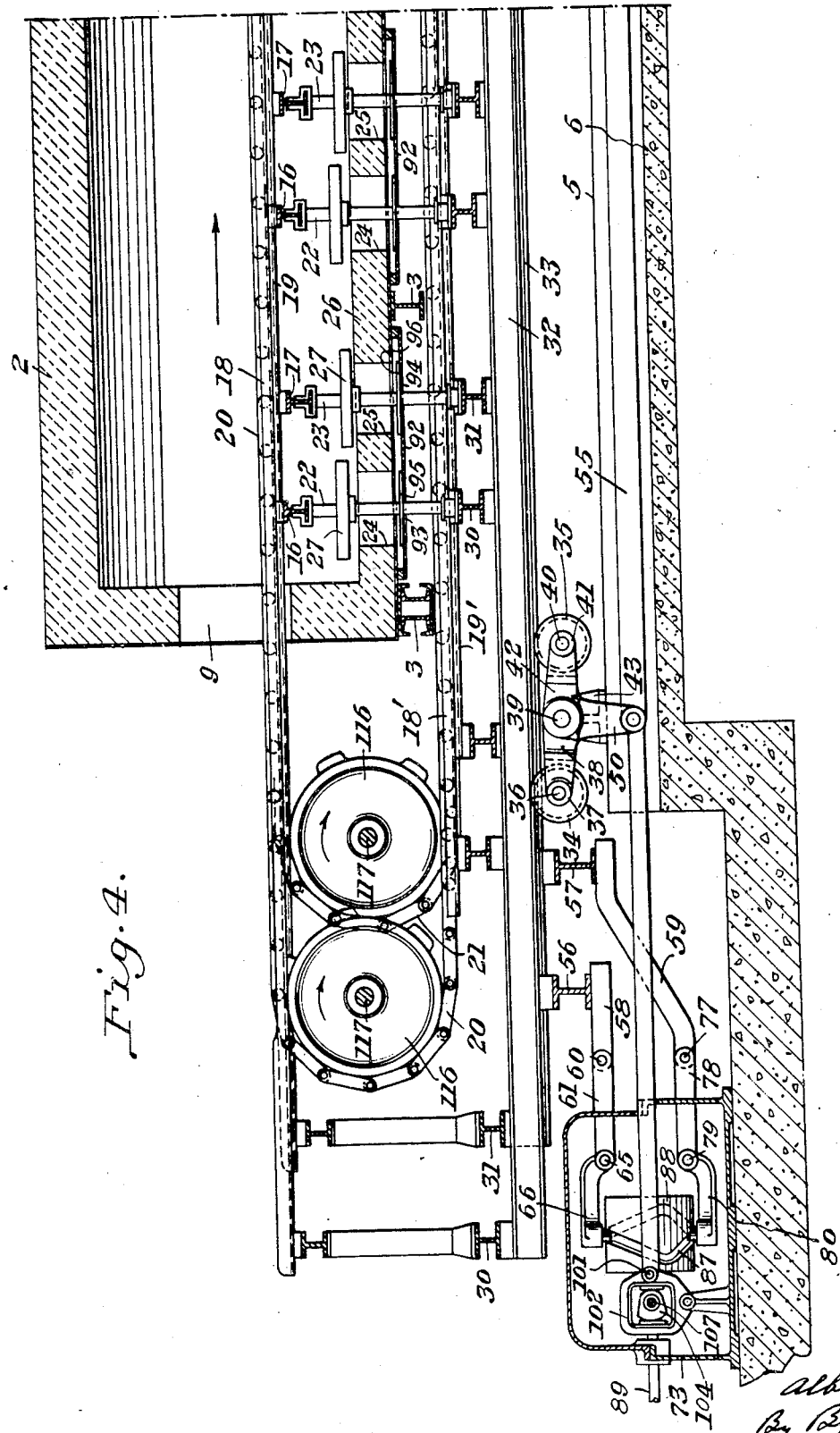

INVENTOR
Albert L. Culbertson
By Byrnes, Stebbins,
Parmelee & Blenko
Attorneys

June 7, 1932. A. L. CULBERTSON 1,861,492
CONTINUOUS FURNACE
Filed Aug. 24, 1931 9 Sheets-Sheet 9
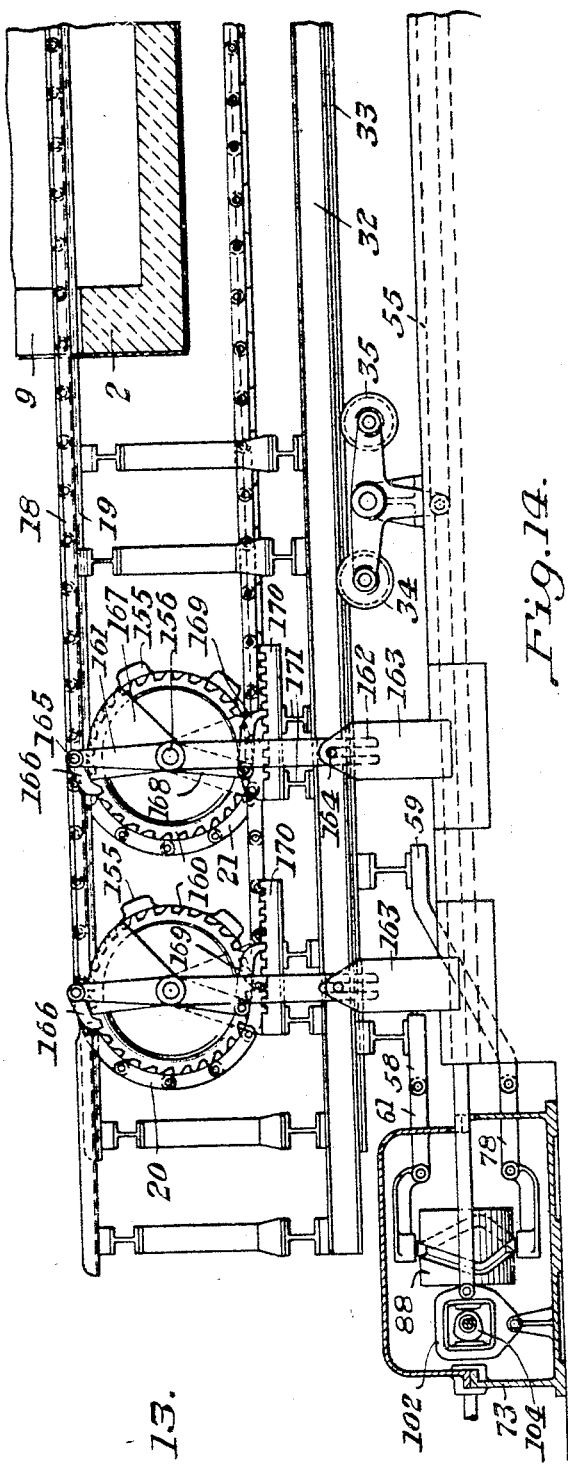
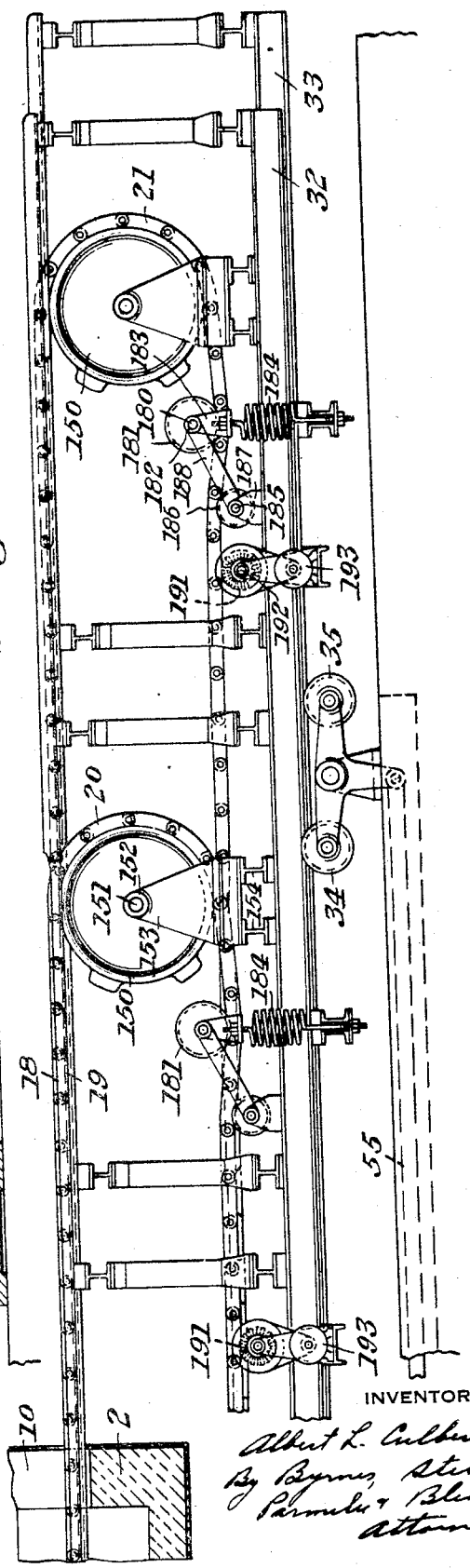
INVENTOR
Albert L. Culbertson
By Byrnes, Stebbins,
Parmelee & Blenko
Attorneys Patented June 7, 1932

1,861,492

UNITED STATES PATENT OFFICE

ALBERT L. CULBERTSON, OF MOUNT LEBANON TOWNSHIP, ALLEGHENY COUNTY, PENNSYLVANIA; LAVERNA M. CULBERTSON AND THE UNION TRUST COMPANY OF PGH, EXECUTORS OF SAID ALBERT L. CULBERTSON, DECEASED

CONTINUOUS FURNACE

Application filed August 24, 1931. Serial No. 558,858.

My invention relates generally to furnaces of the continuous type, and has for its object, the provision of a furnace which will eliminate the marking of the sheets being treated in their passage through the furnace.

All furnaces of a continuous type heretofore used and used at the present time are open to the objection that they mark the sheets during their passage through the furnace, unless rider or waster sheets are used. By my invention, I obviate the necessity of using waster or rider sheets and provide a furnace which will not mark the sheets.

In one type of continuous furnace, the sheets being treated are fed through the furnace on discs which are supported by watercooled shafts. Furnaces of this type are unsatisfactory because a large amount of heat is lost by cooling, and because of lack of uniformity in the product, due to cold spots induced by the cooling of the discs. These furnaces are also unsatisfactory for the reason that oxide accretions build up on the discs and mark the sheets when waster sheets are not used to carry the materials.

It is impossible to satisfactorily keep the discs which carry the material free of oxide accretions without shutting down the furnace. In furnaces of this type, the cleaning or polishing of the discs is done by suspending production for a period of time long enough to introduce some sort of grinder into the furnace and allow the shafts in their rotation to wear protuberances off, as the grinder is slowly allowed to traverse the length of the furnace. This operation has been found necessary periodically from three to six times over a period of twenty-four hours and is not a completely successful method. In addition, it suspends production for three or four hours a day.

Another type furnace which is at present in use and has been used for a number of years, is the so-called "dry shaft" furnace. This type furnace is similar to the wet shaft furnace in that the sheets are fed through the furnace on discs supported by the shafts. The discs and shafts are made of heat resisting alloy. Consequently, it is not necessary to cool the shafts by water. Oxide accretions build up on the surfaces of the discs and cause marking of the sheets, as in the case of the wet shaft furnace. Removal of the oxide accretions from the alloy discs is very expensive, as it entails shutting down the furnace for a considerable period of time each day.

Another type of furnace is the so-called "walking beam" furnace. This type furnace is also unsatisfactory when used without waster sheets, in that there is no satisfactory way of maintaining the supporting surfaces in proper condition. Oxide accretions build up on the supporting surfaces of the beams and mark the sheets. Due to the fact that the walking beams are substantially in one position in the furnace, it is impossible to remove the oxide accretions therefrom without completely shutting down the furnace and allowing it to cool so that men with grinding tools can enter the furnace. The shutting down of this type furnace is extremely expensive in that it takes considerable time for it to cool down to a temperature which will permit persons to enter therein for the purpose of grinding off the accretions. Porcelain inserts or buttons have been used on the walking beams in an effort to eliminate pitting. This expedient has been unsuccessful, inasmuch as the oxide accretions build up on the porcelain buttons and cause pitting of the material.

Another type furnace which is used is the so-called "chain" type furnace, wherein chains are moved through the furnace in the direction of travel of the material. In the "coal chain" furnace, the chain moves through the furnace below the furnace hearth and has alloy fingers projecting through the hearth, which carry the material to be treated. Oxide accretions build up on the alloy supporting surfaces and cause marking of the sheets. The supporting surfaces of the chain may be cleaned at a point outside the furnace and the cleaning operation does not entail shutting down the furnace, as is the case with the walking beam furnace, and does not entail the suspension of operation, as is the case in the wet shaft or dry shaft furnaces.

When proper cleaning means is provided with this type furnace for cleaning material engaging surfaces, pitting or marking of the sheets can be partially eliminated. The sheets, however, are, for a long period of time, in contact with one portion of the chain. This permits the sheets to grow fast to the chains and causes pitting of the sheets.

The fingers which are carried by the chains, and on which the material is supported, are unstable and wobble, causing relative movement between the various supporting surfaces, and consequently, relative movement between the supporting surfaces and the material. This, of course, causes marking or scratching of the material. Furthermore, in this type furnace, it is necessary to support the sheets at several points and, consequently, on several chains. The chains expand unequally and do not travel through the furnace in exactly the same manner. This results in relative movement between the chains, and relative movement between the chains and the material which causes marking or scratching of the material.

The "hot chain" type furnace is also open to the above objections. In this type furnace, the chains support the material directly as they pass through the furnace above the furnace hearth. Due to the fact that there is relative movement between the chains, scratching and marking of the sheets occurs, even though the chains are kept sufficiently clean of oxide accretions. Pitting also occurs due to the fact that the sheets are in contact with the chains for a long period of time.

Rider or waster sheets are absolutely essential in the above types of furnaces, in order to prevent marking of the sheets. The use of waster or rider sheets very materially reduces the efficiency of the furnace, not only by the cost of such sheets, which must be replaced frequently, but also due to the extra labor involved in handling the waster sheets at the charging end of the furnace and again at the discharging end of the furnace. Another disadvantage in the use of waster sheets is that when ordinary steel sheets are used, scaling occurs and the scale which drops off the waster sheets gradually fills up the bottom of the furnace, and requires labor for its removal, and also causes inefficient operation of the furnace during its presence. Another disadvantage in the use of waster sheets is that each time they pass through the furnace considerable heat is utilized in heating the waster sheets up to the normalizing temperature. This loss of heat very materially increases the fuel consumption of the furnace. Another disadvantage in the use of waster sheets is that they reduce the tonnage output of the furnace. An additional sheet could be normalized for each waster sheet passed through the furnace.

By my invention, I provide a furnace which does not require the use of waster sheets and which will not mark the sheets during their passage therethrough.

The furnace which I provide is preferably of the walking beam type. The furnace may be of the single walking beam type having stationary supports for supporting the material during the back travel of the walking beams, or it may be of the double walking beam type having no stationary supports.

The top of each of the walking beams consists of an alloy channel toed up. These channels serve as tracks for continuous alloy chains which extend throughout the length of the furnace from the charging end to the discharging end and pass beneath the furnace back to the charging end thereof. On the forward stroke of the walking beams the chains which are carried thereby are brought into contact with the material being treated and carry the material forward. When the single walking beam type of furnace is used the material is supported by stationary supports during the return movement of the beams. The stationary supports may be provided with chains similar to the chains carried by the walking beams.

When the double walking beam type of furnace is used one set of beams passes through its return stroke during a portion of the time that the other set of beams is passing through its forward stroke. During the return stroke of the beams the chains are out of contact with the material being treated. At the end of the forward stroke of one set of beams the material is transferred to the chains carried by the other set of beams and further carried forward thereby.

In my improved furnace I provide means for imparting a supplemental movement to the chains or other material engaging means. This is true whether the furnace be of the single or double walking beam type. By the provision of means for imparting a supplemental movement to the chains, they may be moved through the furnace so that the supporting surfaces thereof can be cleaned and all oxide accretions removed therefrom at a point without the furnace. The re-surfacing of the chain can take place during the continued operation of the furnace, or operations may be suspended for a short while and the chains passed rapidly through the furnace so as to enable the quick re-surfacing of the whole chain. In normal operation the chains may be moved through the furnace intermittently and at a time when they are out of contact with the material being treated. Any suitable or desirable means can be utilized for driving the chains.

In the accompanying drawings, I have shown, for purposes of illustration only, a preferred embodiment and one modification of my invention.

In the drawings—

Figure 1 is a sectional view of one end of the furnace taken along the line I—I of Figure 3, part of the cover for the beam actuating mechanism being broken away;

Figure 2 is a similar sectional view of the other end of the furnace, showing the chain actuating mechanism in plan;

Figure 3 is a sectional view taken along the line III—III of Figure 5;

Figure 4 is a longitudinal view partly in section and partly in elevation of one end of the furnace showing a portion of the beam actuating mechanism in elevation;

Figure 5 is a similar view of the other end of the furnace;

Figure 9 is an enlarged sectional view of a modified form of chain and its supporting channel;

Figure 10 is a sectional view taken along the line X—X of Figure 2;

Figure 13 is a side elevational view partly in section of the modified form of chain driving mechanism; and Figure 14 is a side elevational view of the other end of the modified form of the chain drive shown in Figure 13.

Figure 6:
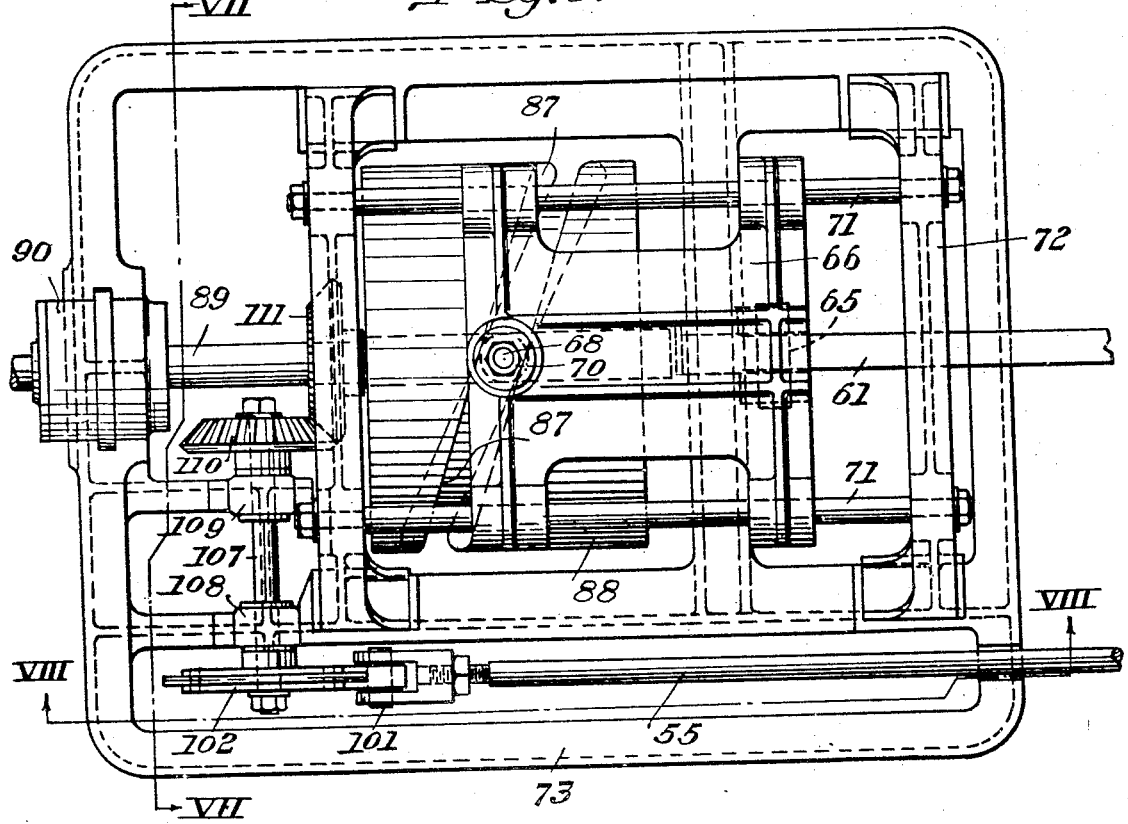
Figure 6 is a plan view of the beam actuating mechanism with the cover removed.
Figure 7:
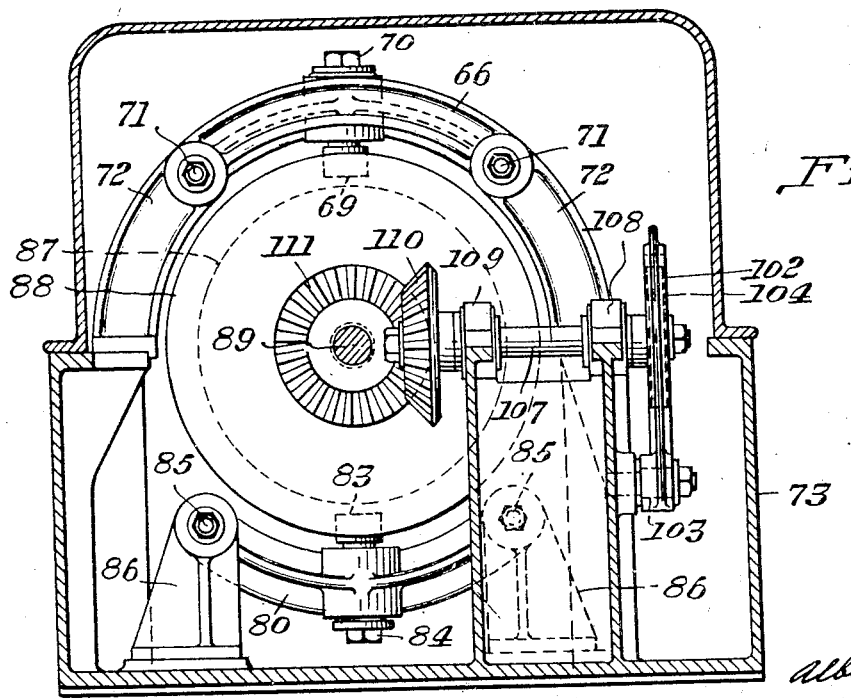
Figure 7 is a sectional view along the line VII—VII of Figure 6.
Figure 8:
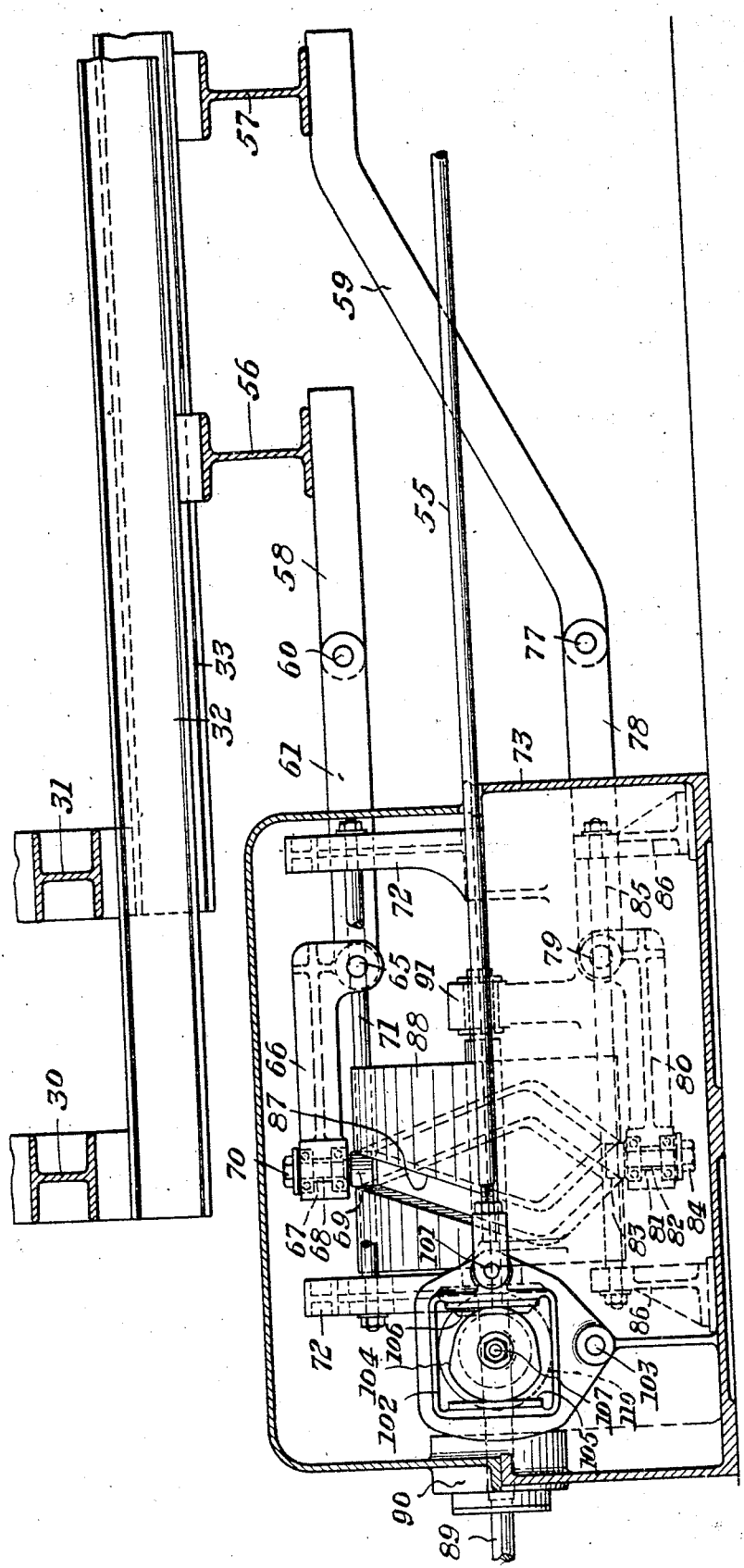
Figure 8 is a vertical sectional view taken along the line VIII—VIII of Figure 6.
Figure 11:
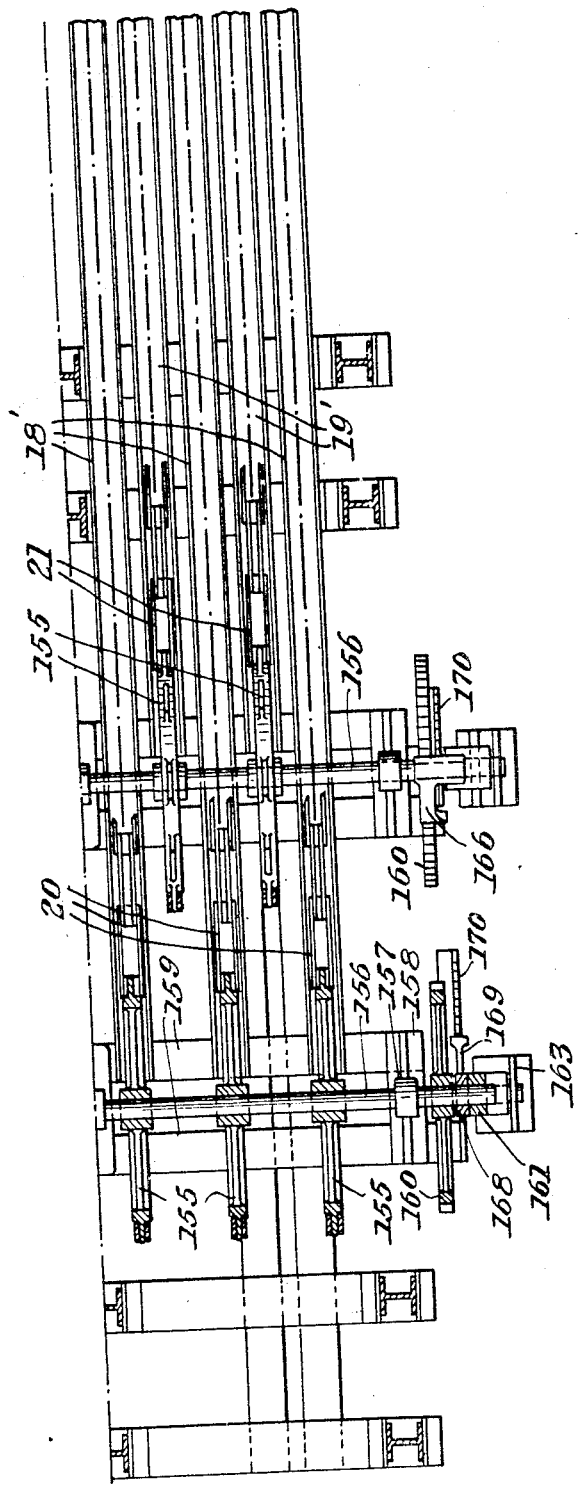
Figure 11 is a partial sectional plan view of a modified form of the chains and driving mechanism therefor.

In the drawings, there is shown a furnace indicated generally by the reference character 2. The furnace is supported on transverse beams or channels 3 which rest on longitudinally extending beams 4, which, in turn, rest on standards 5 which are supported by the floor 6. Fuel and air for combustion are admitted to the furnace through ports 7 and 8. An opening 9 is provided at the charging end of the furnace to admit the material to be heated to the furnace, and an opening 10 is provided at the discharge end of the furnace to permit the discharge of the material from the furnace.

The furnace is of the walking beam type and is provided with a plurality of transverse beams 16 and 17. The transverse beams 16 are adapted to support a plurality of longitudinally extending beams or channels 18. The transversely extending beams 17 are likewise adapted to support a plurality of longitudinally extending beams or channels 19. The beams or channels 18 and 19 are toed up above the surfaces of the supporting transverse beams, so as to prevent them from interfering with the movement of the beams, as hereinafter described. The channels 18 and 19 serve as tracks or supports for the chains 20 and 21, each channel supporting a separate chain. The channels 18' and 19' support the chains beneath the furnace.

The transversely extending beams 16 and 17 are supported on a plurality of vertically extending posts 22 and 23 respectively. The posts 22 and 23 carry radiation seals 27 which are filled with refractory material so as to prevent heat radiated by the material being heated from escaping from the furnace.

The posts 22 and 23 are mounted on beams 30 and 31 respectively which extend transversely of the furnace and beneath the bottom 26. The posts 22 and 23 extend through openings 24 and 25, respectively, through the bottom 26 of the furnace. The transversely extending beams 30 and 31 are, in turn, mounted on longitudinally extending beams 32 and 33 respectively.

The longitudinally extending beams 32 and 33, which extend throughout the length of the furnace and beyond each end thereof, are supported on rollers 34 and 35, respectively, which are located at spaced intervals along the length thereof. The rollers 34 are fixedly mounted on shafts 36 which are journaled in bearings 37 in arms 38 which are mounted on and keyed to transversely extending shafts 39. The rollers 35 which are adapted to support the transversely extending beams 33 are likewise fixedly mounted on shafts 40 which, in turn, are journaled in bearings 41 in arms 42, which are fixedly mounted on the shafts 39. The shafts 39 are supported in bearings in the supports 43.

An arm 50 is mounted on and keyed to each of the shafts 39 intermediate the ends thereof. One end of each of the arms 50 is bifurcated, as at 52. Each portion of the bifurcated end of each of the arms 50 has bearings 53 therein adapted to support a pin 54, which is adapted to connect the arm 50 with a longitudinally extending arm 55. When the rocker arm 55 is reciprocated horizontally, it turns the shafts 39, thereby rocking the arms 38 and 42, which, in turn, through the rollers 34 and 35, raise and lower the beams 32 and 33. This, in turn, through the structure above described, raises and lowers the channels 18 and 19 carrying chains 20 and 21.

The longitudinally extending beams 32 and 33, adjacent one end thereof, have mounted on the bottom thereof transversely extending beams 56 and 57. An arm 58 pivotally connected at 60 to an arm 61 is fixedly attached to the bottom of the transverse beam 56. The arm 61 is pivotally connected at 65 to a reciprocating slide 66. The reciprocating slide 66 is provided with an opening 67 therein adapted to receive a bolt 68 having a large head 69 thereon. The bolt 68 is held in position in the opening 67 by means of a nut 70. The reciprocating slide 66 is supported on guide rods 71 which are mounted in standards 72, which, in turn, are mounted on the main frame 73 of the mechanism for imparting a reciprocating motion to the beams 32 and 33 and for raising and lowering the beams 32 and 33 in the manner described.

An arm 59 is fixedly attached to the bottom of the transverse beam 57 and is pivotally mounted at 77 to an arm 78 which is pivotally attached at 79 to the reciprocating slide 80, which is similar to the reciprocating slide 66. The reciprocating slide 80 has an opening 81 therein adapted to receive a bolt 82 having a large head 83 thereon. The bolt 81 is kept in place by means of a nut 84. The reciprocating slide 80 is supported on guide rods 85 mounted on standards 86 which are attached to the main frame 73 of the reciprocating mechanism.

The heads 69 and 83 of the bolts 68 and 82 are adapted to engage the cam groove 87 of the drum cam 88 at points directly opposite each other. The drum cam 88 is mounted on a shaft 89 journaled in bearings 90 and 91. The shaft 89 may be connected to any desirable driving means for rotating it. When the shaft 89 and the drum cam 88 are rotated the heads 69 and 83 of the bolts 68 and 82, respectively, follow the eccentric cam groove 87 which imparts a reciprocating movement to the reciprocating slides 66 and 80, which, in turn, impart a horizontal reciprocating motion to the beams 32 and 33. Due to the fact that the portion of the cam groove 87 which imparts the forward motion to the reciprocating slides 66 and 80 is longer than the portion of the cam which imparts the rearward motion to the slides, the beams 32 and 33 travel in the same direction, namely, forward during a small portion of their strokes. During a portion of the forward stroke of the beams 32 the beams 33 are passing through their rearward or return stroke.

The longitudinally extending rocker arm or rod 55 is pivotally connected at 101 to the frame of the yoke cam 102. The yoke cam 102 is pivotally mounted at 103 to the main frame. The yoke cam 102 is oscillated by means of the rotation of the cam 104, which bears on the bearing surfaces 105 and 106 located on opposite sides of the frame. The cam 104 is mounted on and keyed to the shaft 107, which is mounted in bearings 108 and 109. The shaft 107 is rotated through mitre gears 110 and 111, the mitre gear 111 being mounted on the shaft 89, which, as hereinbefore stated, may be rotated by any desirable means. When the shaft 89 is driven, a horizontal reciprocating motion is imparted to beams 32 and 33 through the mechanism above described, and a vertical reciprocating motion is also imparted to the beams 32 and 33 by means of the mechanism just described.

A plate 92 is fastened to the bottom of the hearth 26 of the furnace, adjacent each pair of openings 24 and 25. Each plate 92 has openings 93 and 94 therein adapted to permit the posts 22 and 23, respectively, to pass therethrough and to permit the longitudinal movement of the posts. Plates 95 and 96 are slidably mounted on the posts 22 and 23 and are adapted to cooperating with the openings 93 and 94 to prevent the escape of gases and/or heat from the furnace, and infiltration of air into the furnace. A sufficient clearance is provided between the plates 92 and the hearth of the furnace, to permit the plates 95 and 96 to be moved longitudinally with the movement of the posts 22 and 23.

The chains 20 and 21 are continuous and pass through the furnace, over sprocket wheels 115 at the discharge end of the furnace, under the furnace, and over sprocket wheels 116 at the charging end of the furnace. The sprocket wheels 116 are mounted on and keyed to shafts 117, which are journaled in bearings 118 in standards 119, which are supported on transverse beams 123, which are, in turn, supported on the longitudinally extending beams 32 or 33. The sprocket wheels 115 are mounted on and keyed to shafts 120, which are supported in bearings 121 in standards 124 carried by transversely extending beams 122, which are carried by the longitudinally extending beams 32 or 33.

A ratchet wheel 126 is mounted on and keyed to each shaft 120. Arms 127 are mounted on each shaft 120 and rotatable relative thereto. A shaft or pin 128 connects the arms 127 on each shaft 120, the arms 127 being rotatably mounted on the shaft 128. One end of a lever 129 is rotatably mounted on each shaft 128. The other end of each lever 129 is rotatably mounted on a pin 130, which is carried by a disc 131. Each disc 131 is mounted on a shaft 132 and keyed thereto. Each shaft 132 is mounted in a bearing 133, which is supported by the main frame of a speed reducer 134. Each shaft 132 is connected through its speed reducer 134 to a shaft 135 driven by a motor 136.

A pawl 137 is mounted on a pin 138 carried by each pair of arms 127. Each pawl 137 is pressed into engagement with the teeth of its ratchet wheel 126 by means of a spring 139. When the arms 127 are moved in one direction by the levers 129, the pawls 137 slide over the teeth of the ratchet wheels 126 and do not rotate the shafts 120. When the arms 127 are pulled in the reverse direction by the levers 129, the spring-pressed pawls 137 engage the teeth of the ratchet wheels 126 and rotate the shafts 120 in the desired direction. This serves to impart a supplemental movement to the chains and to cause them to travel through the furnace relative to the supporting channels or beams.

The motors 136, which are used to drive the levers 129 through the rotation of the discs 131, are mounted on transversely extending beams 140 which are carried by beams 32 or 33. Consequently, the whole chain drive mechanism is supported and carried by the longitudinally extending walking beams.

In the apparatus shown in the drawing it is desirable that the motors for driving the chains be not continuously operating. In order to intermittently drive each motor, a make-and-break switch may be placed in the motor circuit. To this end one of the contacts 142 of the make-and-break switch may be carried by one of the transversely extending beams. The other contact 143 of the switch may be carried by the floor. When the beam carrying the contact 142 is in its lowermost position it engages the contact 143, completing the circuit. When the beam carrying the contact 142 is raised, the circuit is broken, stopping the motor and the chain drive mechanism.

The chains may be driven through the furnace in the direction indicated by the arrows in Figures 4 and 5, or they may be driven in the reverse direction, and any apparatus for driving the chains in the desired direction may be used.

In Figure 9 I have shown a modified form of chain which provides a greater material engaging surface than the chain illustrated in the other figures of the drawings. In this form of chain, brackets 145 having sidewise extending material engaging portions 146 are fastened to each side of the chain by means of the pins 147 which pass through openings 148 in the brackets.

In Figures 11 to 14, inclusive, I have shown a modified form of chain drive. In the embodiment shown in these figures, the movement of the chains through the furnace relative to the longitudinally extending beams or channels 18 and 19 is effected through the movement of the beams 32 and 33. In this embodiment the use of separate driving motors for actuating the chains is made unnecessary.

The chains pass around sprocket wheels 150 which are located adjacent the discharge end of the furnace. The sprocket wheels 150 are mounted on transversely extending shafts 151, which are mounted in bearings 152 supported on standards 153, which are supported by transversely extending beams 154, which are mounted on the longitudinally extending beams 32 or 33.

At the charging end of the furnace, the chains pass around sprocket wheels 155, which are mounted on shafts 156 which are mounted in bearings 157 supported by standards 158. The standards 158 are supported on transversely extending beams 159, which, in turn, are supported by the longitudinally extending beams 32 or 33. Each shaft 156 has mounted thereon and keyed thereto a ratchet wheel 160. When the ratchet wheels 160 are rotated, the chains are moved through the furnace relative to the beams or channels 18 and 19 which carry them.

For the purpose of rotating the ratchet wheels a lever arm 161 is rotatably mounted intermediate its ends on each shaft 156. The lower end of each lever arm 161 is bifurcated, as at 162. Brackets 163 are fixedly attached to the floor or some other stationary element. The brackets 163 carry stationary pins 164. The bifurcated end of each lever arm 161 is adapted to fit over one of the pins 164.

The other end of each lever arm 161 has pivotally mounted thereon at 165 a pawl 166, which is adapted to engage the teeth of a ratchet wheel 160. When the beams 32 and 33 are reciprocated by the reciprocating mechanism, the shafts 156 are carried therewith. Since the bifurcated end of each lever arm 161 passes over a stationary pin 164, each lever arm 161 is rocked about its shaft 156. When rocked in one direction, each pawl 166 rides over the teeth of its ratchet wheel. When rocked in the other direction, each pawl 166 rotates its ratchet wheel 160, thereby rotating its shaft 156 and causing the chains to move through the furnace.

A quadrant plate 167 having an extension arm 168 thereon is rotatably mounted on each shaft 156 adjacent the ratchet wheel 160 thereon and adjacent the pawl 166. A pawl 169 is pivotally mounted on the lower end of each extension arm 168. Each pawl 169 is adapted to engage a rack-rod 170, which is supported on beams 171, which are supported on beams 32 or 33. The quadrant plates 167, the pawls 166, the rack-rods 170 and the pawls 169 are so arranged that the distance through which each ratchet wheel is turned, during each cycle of movement of the beams 32 or 33, may be determined. The pawls 166 during the inactive portion of the stroke ride over the tops of the quadrant plates 167.

Figure 12:
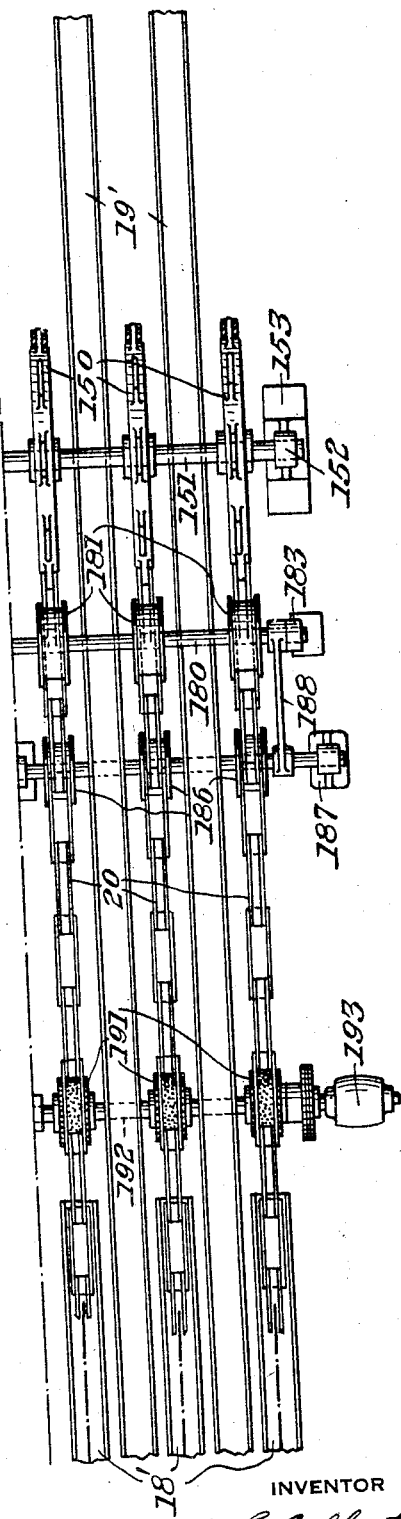
Figure 12 is a partial sectional plan view of the other end of the chain and driving mechanism shown in Figure 11.

It is generally desirable that means be provided to keep the chain taut. In Figures 12 and 14, I have shown means to accomplish this purpose. For each set of chains, a transversely extending shaft 180 carrying rollers 181 is provided. The rollers 181 are adapted to engage the upper surfaces of the chains. Each shaft 180 is mounted in bearings 182 carried by adjustable brackets 183. The brackets 183 carrying shafts 180 are pulled downwardly by means of springs 184, so that the slack in the chain will be taken up. Each set of chains is also provided with a transversely extending shaft 185 carrying rollers 186 which are adapted to engage the lower surfaces of the chains. These shafts 185 are mounted in bearings carried by brackets 187, which brackets are carried by the beams 32 or 33. A link 188 connects each pair of shafts 180 and 185, each link 188 being rotatably mounted on its shafts.

It is further desirable to provide means adjacent one end of the furnace, for the purpose of cleaning and resurfacing the chains, so as to remove therefrom any oxide accretions which have built up thereon during the passage of the chains through the furnace. In Figures 12 and 14, I have shown such means. In these figures, there is shown for each set of chains, a plurality of polishing or grinding wheels 191 carried by a shaft 192, which shaft is adapted to be rotated by means of a motor 193.

As may be readily seen from the above description of the furnace which I provide, the chains when in contact with the material being treated are actuated by the walking beams. Due to this fact, the chains when in contact with the material are carried forward simultaneously and in equal amounts. Consequently, there is no relative movement possible between the various material supporting surfaces, and, therefore, no relative movement between the material being carried and the supporting surfaces. This eliminates all scratching of the sheets.

A supplemental movement is imparted to the chains for moving them through the furnace and at a time when they are out of contact with the material being treated. When one set of chains is being moved through the furnace, relative to the walking beams, the material is supported by the other set of chains. The chains may be moved through the furnace relative to the walking beams at any desired rate of speed. When it is desired, however, to quickly resurface the whole of each of the chains, operations may be suspended for a short while and the chains rapidly run through the furnace.

While I have shown and described a preferred embodiment of my invention and one modification thereof, it is to be understood that my invention is not to be limited thereby, but may be otherwise embodied within the scope of the appended claims.

I claim:

1. In combination with a walking beam furnace, material engaging means actuated by the beam movement, and means for moving said engaging means, to impart a supplemental movement thereto and to bring said engaging means to a cleaning position.

2. In combination with a walking beam furnace, material engaging means actuated by the beam movement, and means for moving said engaging means, to impart a supplemental movement thereto when said means is out of contact with the material and to bring said engaging means to a cleaning position.

3. In combination with a walking beam furnace, material engaging means actuated by the beam movement, and means for moving said engaging means, to impart a supplemental movement thereto in the direction of travel of the material through the furnace and to bring said engaging means to a cleaning position.

4. In combination with a walking beam furnace, material engaging means actuated by the beam movement, and means for moving said engaging means, to impart a supplemental movement thereto in a direction opposite to the travel of the material through the furnace and to bring said engaging means to a cleaning position.

5. In combination with a walking beam furnace, a plurality of chains carried by the beams and adapted to engage the material, said chains being actuated by the beam movement, and means for moving said chains to impart a supplemental movement thereto and to bring said chains to a cleaning position.

6. In combination with a walking beam furnace, material engaging means supported by the beams and actuated by the beam movement, and motor-driven means for moving the material engaging means to a cleaning position.

7. In combination with a walking beam furnace, material engaging means supported by the beams and actuated by the beam movement, and means actuated by the beam movement for imparting a supplemental movement to the material engaging means for moving said engaging means to a cleaning position.

8. A continuous furnace comprising material engaging means, means for imparting an orbital movement having a vertical component to the material engaging means, additional material engaging means, and means for imparting a supplemental movement to the first mentioned material engaging means when out of supporting relationship with the material and for moving said means to a cleaning position.

9. A continuous furnace comprising a carrier, material engaging means carried by the carrier, means for moving the carrier and the material engaging means into and out of supporting relationship with the material, said movement having a horizontal component, and means for imparting a supplemental movement to the material engaging means when out of supporting relationship with the material for moving said means to a cleaning position.

10. A continuous furnace comprising material engaging means, means for imparting an orbital movement having a vertical component to the material engaging means, whereby said material engaging means is moved into and out of supporting relationship with the material, and means for imparting a supplemental movement to the material engaging means when out of contact with the material for moving said means to a cleaning position.

11. A continuous furnace comprising a plurality of beams, means for imparting an orbital movement having a vertical component to the beams, material engaging means carried by the beams, and means for moving the material engaging means relatively to the beams to a cleaning position.

12. A continuous furnace comprising a plurality of beams, means for imparting an orbital movement having a vertical component to the beams, material engaging means carried by the beams, and means for intermittently moving the material engaging means to a cleaning position when out of supporting relationship with the material.

13. A continuous furnace comprising a plurality of sets of beams, material engaging means carried by the beams, means for moving the sets of beams with the material engaging means thereon alternately into and out of supporting relationship with the material, and means for moving the material engaging means to a cleaning position when out of contact with the material.

14. A continuous furnace comprising a plurality of sets of beams, a plurality of chains carried by the beams, means for moving the sets of beams with the chains thereon alternately into and out of supporting relationship with the material, and means for moving the chain relative to the beams to a cleaning position when out of supporting relationship with the material.

15. A continuous furnace comprising a carrier, means for moving the carrier in a vertical direction, means for moving the carrier in a horizontal direction, material engaging means carried by the carrier, and means for imparting a supplemental movement to the material engaging means for moving said engaging means relative to the carrier to a cleaning position.

16. A continuous furnace comprising a plurality of beams, means for moving the beams in a vertical direction, means for moving the beams in a horizontal direction, material engaging means carried by the beams, and means for imparting a supplemental movement to the material engaging means for moving said means to a cleaning position.

17. A continuous furnace comprising a plurality of beams, means for vertically reciprocating the beams, means for horizontally reciprocating the beams, a plurality of chains carried by the beams and actuated by the beam movement adapted to support the material, and means carried by the beams for imparting an intermittent supplemental movement to the chains for moving the chains relative to the beams and to a cleaning position.

18. A continuous furnace comprising a carrier, means for actuating the carrier, supplemental material engaging means movable into a position for cleaning, and means supplemental to the carrier for moving the material engaging means relative to the carrier into such position whereby said engaging means may be cleaned.

19. A continuous furnace comprising material engaging means, means for moving the material engaging means into and out of engagement with the material, said movement having a vertical component, and for moving the material through the furnace, and means for imparting a supplemental movement to said engaging means when out of engagement with the material and for moving said engaging means into a cleaning position.

20. In combination with a walking beam furnace, material engaging means carried by a beam, and means other than the beam movement for imparting a supplemental movement to said material engaging means for moving said engaging means to a cleaning position.

21. In combination with a walking beam furnace, material engaging means carried by a beam, other material engaging means within the furnace, and means for moving each of said material engaging means to a cleaning position.

In testimony whereof I have hereunto set my hand.

ALBERT L. CULBERTSON.